3,013,536
FLUID PRESSURE MOTOR CONSTRUCTION
Maxwell L. Cripe, South Bend, Ind., assignor to The Bendix Corporation, a corporation of Delaware
Filed Jan. 29, 1959, Ser. No. 789,997
6 Claims. (Cl. 121—41)

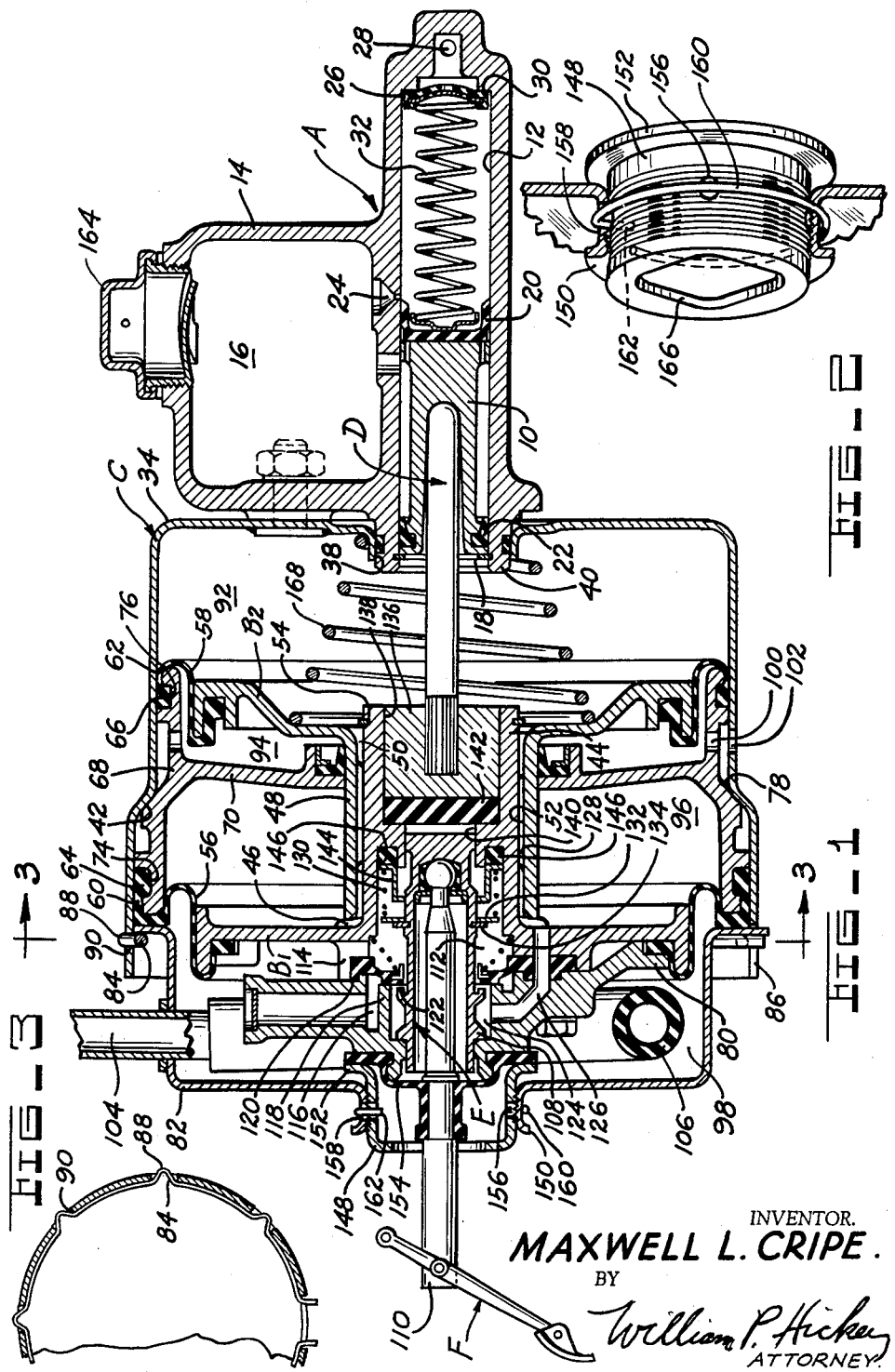

The present invention relates to fluid pressure motors having a pair of movable walls arranged in tandem; and more particularly to units of the above mentioned type using diaphragm seals with respect to its cylinder walls.

An object of the present invention is the provision of a new and improved fluid pressure motor of the above mentioned type which is simple in its construction, inexpensive to manufacture, and efficient in its operation.

Another object of the invention is the provision of a new and improved fluid pressure servomotor of the above mentioned tandem diaphragm type which is constructed and guided in a manner which will not produce a binding upon its partition member during operation.

The invention resides in certain constructions and combinations and arrangements of parts; and further objects and advantages of the invention will become apparent to those skilled in art to which the invention relates from the following description of the preferred embodiment described with reference to the accompanying drawing forming a part of this specification and in which:

FIGURE 1 is a cross sectional view of a fluid pressure servomotor driven master cylinder for actuating the brakes of an automotive vehicle, and which embodies principles of the present invention;

FIGURE 2 is a fragmentary isometric view showing a part of the unit seen in FIGURE 1; and FIGURE 3 is a fragmentary cross sectional view better illustrating a fastening device seen in FIGURE 1.

The fluid pressure servomotor driven master cylinder shown in the drawing is of the type used to power actuate the hydraulic braking systems of automotive vehicles. The unit shown in the drawing generally comprises a hydraulic master cylinder A having a fluid displacement member 10 therein that is driven by a pair of power actuated pistons $B_1$ and $B_2$ of the vacuum powered fluid pressure servomotor C that is suitably bolted to one end of the hydraulic master cylinder A. Force from the pistons $B_1$ and $B_2$ is transmitted to the fluid displacement piston 10 by means of a push rod D; and power actuation of the pistons $B_1$ and $B_2$ is controlled by means of valve structure E carried by the pistons and which in turn is actuated by the foot pedal lever F of the automotive vehicle.

The master cylinder A is of conventional construction wherein the fluid pressurizing chamber 12 which slidably receives the displacement piston 10 is positioned in a casting 14 which also includes a reservoir cavity 16 in the region overlying the fluid pressurizing chamber 12. The fluid pressurizing chamber 12 opens into the end of the casting 14 that is bolted to the servomotor C, and the fluid displacement member 10 is prevented from being withdrawn from the fluid pressurizing chamber 12 by means of a snap ring 18 which acts as a return stop for the displacement piston 10. The fluid displacement piston 10 is provided with suitable seals 20 and 22 adjacent its inner and outer ends respectively, and a suitable compensating port 24 is provided between the reservoir 16 and the chamber 12 in the region forwardly of the seal 20 when the piston 10 is adjacent to the stop 18. Fluid displaced by the piston 10 flows through a suitable back pressure valve 26 which may be of the construction shown in application Serial No. 676,699, filed August 2, 1957, and which permits fluid to be forced through suitable openings therein to the outlet port 28 to the brakes of the vehicle. The back pressure valve 26 is urged against a shoulder 30 by a coil spring 32 to prevent flow from the chamber around the outside edges of the back pressure valve. Return flow through the outlet port 28 lifts the back pressure valve 26 from the shoulder 30 until such time as its pressure upon the valve equals the force of the coil spring 32—at which time the back pressure valve again seats to the thereafter hold a predetermined slight positive pressure upon the system to which port 28 is connected.

The fluid pressure motor C shown in the drawing is formed by means of a stamped generally cylindrically cup-shaped shell 34 having a centrally located flanged opening in its bottom end 38 which receives and is suitably sealed to a boss 40 of the master cylinder A through which boss its fluid pressuring chamber 12 extends. The sidewalls of the internal power chamber of the servomotor C are generally smooth and cylindrically shaped for reasons which will later be apparent, and also are provided with a stepped down portion or shoulder 42 spaced from its outer end.

As previously indicated the servomotor C is provided with a pair of pistons $B_1$ and $B_2$—which pistons are spaced axially of each other in a tandem arrangement. The outer piston $B_1$ is provided with an axially inwardly extending boss 44 having four circumferentially spaced fillets 46 on its outer surface at its point of juncture with the main body portion of the piston $B_1$; and the piston $B_2$ is provided with an axially outwardly extending annular boss 48 which telescopes over the external fillets 46 of the piston $B_1$. The piston $B_2$ is provided with a plurality of spaced apart axially extending internal fillets 50 adjacent the inner end of its internal opening 52, which fillets 50 engage the surface of the boss 44 to space the bosses 44 and 48 apart and thereby provide a fluid flow passage therebetween. Telescopic movement of the piston $B_2$ upon the piston $B_1$ is prevented by abutment of the outer end of its boss 48 with the fillets 46; and separation of the pistons $B_1$ and $B_2$ is prevented by means of a snap ring 54 suitably carried by the inner end of the boss 44 and which is abutted by the ends of the fillets 50 formed on the inner face of the piston $B_2$.

Power pistons $B_1$ and $B_2$ are of the diaphragm type in which a diaphragm structure is used to affect a seal between the center rigid portion of the piston and the sidewalls of the servomotor to separate the motor into opposing fluid pressure chambers. The diaphragms 56 and 58 of the pistons $B_1$ and $B_2$ respectively are of a new and improved design having a pre-molded laterally (generally axially extending) turned portions 60 and 62 respectively which end in radially inwardly protruding bulges 64 and 66 respectively and by reason of which a suitable seal is affected with respect to the sidewalls of the servomotor's internal chamber when the diaphragms are slid axially into position in said chamber. The laterally turned portions 60 and 62 are stretched over the opposite ends of an annular partition member 68 having a radially inwardly extending portion 70 which affects sliding seal with respect to the external surface of the annular boss 48 of the piston $B_2$. The outer peripheral axially extending flange of the partition member 68 is provided with a pair of grooves 74 and 76 in its outer surface adjacent its opposite ends, and the bulges 64 and 66 are stretched over their respective ends of the partition member 68 to be received in the grooves 74 and 76, respectively. The clearance provided by the opposite end portions of the axially extending flange 72 and the bottom of their respective recesses 74 and 76 with respect to sidewalls of the servomotor's internal chamber is less than the thickness of the laterally turned portions of the diaphragms 56 and 58 respectively; so that when the internal partition member 68 having the diaphragms 56 and 58 stretched thereon is inserted into the shell 34, a seal is accomplished therebetween. Inward movement of the partition member 68 is limited by the stepped down portion 42 of the shell 34. The shoulder 42 may be made to operatively abut any portion of the partition member 68, as for example the face of the diaphragm 58; and in the preferred embodiment shown in the drawing, is so positioned as to engage a similar shoulder provided on the partition member 68 generally opposite to its radially inwardly extending portion 70.

The servomotor is assembled by placing the partition member 68 over the annular boss 48 of a piston $B_2$ having a diaphragm 58 sealingly attached thereto—following which the boss 44 of piston $B_1$ is slipped into the annular boss 48 and locked in place with the snapped portion 54. The inner end of diaphragm 56 is positioned on the piston $B_1$ and locked in place by means of valve cover plate 80, and the outer ends of the diaphragm 56 and 58 are expanded over their respective ends of the partition member 68. The composite structure so formed is then slid axially into the shell 34 until its shoulder 74 abuts the shoulder 42 to thereby squeeze the folded over portion 60 and 62 against the cylindrically shaped sidewalls of the servomotor and thereby affect a seal therewith. The assembly is locked in place by means of a cover plate 82 whose outer peripheral edge is just received within the shell 34 and which is pressed up against the outer surface of the diaphragm 56. The cover plate 82 is in turn held in place by means of a piece of bent wire 84 which extends around the inside of the shell 34 and whose ends project out through a slot 86 adjacent the open end of the shell 34. The bent wire 84 has eight evenly spaced radially outwardly extending loop portions 88 which in the assembled position of the wire, project out matching openings 90 through the sidewalls of the shell 34. The matching openings 90 are spaced apart axially from the shoulder 42 at such a distance as to permit the loops of the internal wire 88 to snap into the openings 90 when the partition member 68 is in abutment with the shoulder 42 and pressure is applied to the cover plate 82 to hold it against the diaphragm 56. The portion of the diaphragm 56 that is abutted by the cover plate 82 will preferably include a plurality of evenly spaced knobs or projections which can be yieldingly compressed to accommodate the manufacturing tolerances of the parts.

As previously indicated the servomotor shown in the drawing is a tandem piston unit having an inner power piston $B_2$ and outer power piston $B_1$. The inner power piston $B_2$ divides the space between the partition member 68 and the inner end of the servomotor shell 34 into and inner opposed fluid pressure chamber 92 positioned forwardly of the piston $B_2$, and an outer opposing chamber 94 positioned between piston $B_2$ and the partition member 68. The power piston $B_1$ divides the space between the partition member 68 and the outer cover plate 82 into an inner opposing power chamber 96 positioned forwardly of the piston $B_1$, and an outer opposing power chamber 98 positioned rearwardly of the piston $B_1$. The servomotor shown in the drawing is what is known as an atmospheric suspended unit in which the inner and outer opposing chambers for both pistons are communicated with atmospheric pressure during the normal deenergized condition of the servomotor; and in which unit, vacuum from the intake manifold of the vehicle's propelling engine is communicated to both of the inner opposing power chambers 92 and 96 when the servomotor is actuated. The outer opposing chamber 94 for the piston $B_2$ is continually communicated with the atmosphere through openings 100 and 102 through the partition member 68 and shell 34 respectively; and the outer opposing power chamber 98 for the piston $B_1$ is continually communicated with the atmosphere through a suitable opening in the cover plate 82. Vacuum from the intake manifold of the vehicle's propelling engine is communicated to the servomotor through the vacuum conduit 104 having a flexible proportion 106 which coils around the inside of the servomotor and is connected to the control valve structure E that is carried by the unit's internal power piston structure.

The control valve structure E is formed by suitable valve chambers that are integrally cast in the piston $B_1$ and valve cover plate 80; and control of the unit is had by means of an axially positioned valve plunger or poppet member 108 which in turn is actuated from the brake pedal lever F of the vehicle by means of an interconnecting push rod 110.

The atmospheric valve chamber 112 is formed by means of an axially positioned cavity in the piston $B_1$ and which is at all times communicated with its outer opposing power chamber 98 through a passage 114; and the vacuum valve chamber 116 is formed by an annular cavity in the valve cover plate 80 that surrounds and is separated from the poppet member 108 by an annular vacuum valve seat 118. Vacuum is continually communicated with the vacuum valve chamber 116 by the flexible vacuum conduit portion 106; and the vacuum valve chamber 116 is separated from the atmospheric valve chamber 112 by a flexible diaphragm 120, through the central opening of which the poppet member 108 extends. The portion of the diaphragm surrounding the poppet member 108 is suitably stiffened to provide firm engagement with the vacuum valve seat 118, and the outer portion of the diaphragm 120 is sealingly clamped between the valve cover plate 80 and the main body portion of the piston $B_1$. Poppet member 108 is provided with a shoulder or atmospheric valve seat 122 which is adapted for sealing engagement with the diaphragm 120, and which is capable of lifting the diaphragm from engagement with the vacuum valve seat 118. The annular space between the atmospheric and vacuum valve seats 122 and 118 respectively provides the valve's control pressure chamber 124; and the chamber 124 is at all times communicated with the inner opposing power chamber 96 through the control passageway 126. The inner opposing power chamber 96 is in turn at all times communicated with the other inner opposing power chamber 92 through the annular clearance 128 which has been described as being formed between the bosses 44 and 48 of the pistons $B_1$ and $B_2$ respectively. The atmospheric valve seat 122 is normally held out of engagement with the diaphragm 120 by means of a valve return spring 130 that is interpositioned between a washer 132 attached to the poppet member 108 by means of a snap ring 134 and the other end of which operatively abuts the inner end of the atmospheric valve chamber 112 to communicate atmospheric pressure to the chambers 92 and 96.

In order that the units will be provided with reaction means for apprising the operator of the amount of force which is being delivered to the master cylinder A, the push rod D is provided with a plunger 136 that is slidingly received within a bore 138 in the inner end of the boss 44. The inner end of the poppet member 108 is received in a smaller diameter bore 140 that communicates with the bore 138; and a rubber disk 142 is positioned between the bottom of the bore 138 and the plunger 136, so that it will be resiliently squeezed into engagement with the inner end of the poppet member 108 when the piston structure exerts force against the plunger 136. During no power conditions, the inner end of the poppet member 108 will be forced directly into engagement with the rubber disk 142 to thereby manually actuate hydraulic piston 10. In order that the plunger 136 will not be forced out of its bore 138, a washer 144 of Z-shaped cross section is interposed between the washer 132 and the power piston structure so that the washer 132 will engage the Z-shaped washer 144 before the plunger 136 is moved out of the bore 138. A rubber washer 146 is positioned between the Z-shaped washer 144 and the piston structure $B_1$ to prevent audible clicking noises.

The power operated master cylinder shown in the drawing is a comparatively short stroke unit in which the fluid displacement member 10 will have a maximum stroke of approximately 1¼ inches. The foot pedal lever F which actuates the unit is provided with a mechanical advantage of approximately 3; so that any lost motion produced by the stack up of manufacturing tolerances, very noticeably effects the feel and the performance of the unit. As previously indicated, compensation between the fluid displacement chamber 12 and the reservoir 16 is accomplished by means of an interconnecting port 24 which is sealed off when the forward piston seal 20 is slid forwardly over its opening in the sidewalls of the chamber 12. The fluid that is within the chamber 12 cannot be pressurized, therefore, until the forward lip of the seal 20 has been slipped forwardly over the port 24; and it will, therefore, be seen, that any forward motion of the piston 10 prior to the time that the port 24 is closed off, does no useful work—and what is more, is reflected in considerable annoying play in the foot pedal lever F.

In order that the unit shown in the drawing can be manufactured by conventional production machinery and still provide an acceptable, satisfactory feeling and operating unit, suitable and inexpensive means are provided which permits the seal 20 to be quickly and accurately located with respect to the port 24. The structure comprises a generally cup-shaped stamping 148 having rolled threads on its outer circumference, which in turn engage threads that are rolled on the inside of an axially outwardly extending flange portion 150 that is stamped on the units cover plate 82. The inner end of the cup-shaped stamping 148 is rolled over to provide an abutment flange 152, and a rubber valve rod seal 154 is positioned over the push rod 110 with its outer periphery interpositioned between the flange 152 and the valve cover plate 80 to provide a resilient bumper. In order that the cup-shaped stamping 148 can be axially positioned quickly during the assembly operation, its sidewalls are provided with four holes 156 therethrough—any one of which may be aligned with a corresponding opening 158 through the sidewalls of the flange 150. A coiled wire spring 160 is provided with a radially inwardly extending leg 162, so that the wire can be snapped around the outside of the flange portion 150 with its leg 162 projecting into the opening 158. Once the cup-shaped stamping 148 is approximately positioned and the leg 162 is inserted into the opening 158, rotation of something less than 90° of the cup-shaped stamping 148 will align one of its holes 156 with the opening 158; whereupon the leg 162 will snap through the aligned hole 156 to lock the cup-shaped stamping 148 in place. Prior to the time that the coil spring 160 is installed upon the flange 150, the assembler looks through the opening provided for the filler cap 164 for the reservoir 16 to observe whether or not the lip of the seal 20 is covering the compensating port 24. In some instances a wire might be inserted into port 24 to tell whether or not the seal 20 has cleared the port. In the preferred method of assembly, the cover plates 82 will come to the assembler with their cup-shaped stampings 148 projecting a considerable distance axially inwardly. When so assembled, the seal 20 will be observed to close off the port 24; and after the assembler backs the cup-shaped stamping 148 off with respect to the cover plate 82 to the point where the lip of the seal 20 is seen to move past the center of the port 24, the spring 160 is placed into position as previously described. Thereafter the cup-shaped stamping 148 is further backed off until the leg 162 snaps into its locking position. The outer end of the cup-shaped stamping 148 is provided with a generally square opening 166 to receive a specially made annular adjusting tool which slips over the push rod 110 and fits into the square opening 166 to rotate the stamping 148.

The pistons $B_1$ and $B_2$ are normally held into engagement with the cup-shaped stamping 148 by means of the coil spring 32 and the power piston return spring 168 that is positioned between the piston $B_2$ and the inner end of the shell 34. Operation of the unit shown in the drawing is initiated by depressing the foot pedal lever F; whereupon the atmospheric valve seat 122 is moved out of the position shown in the drawing into engagement with the valve's diaphragm 120 to close off further communication of the atmospheric valve chamber 112 with the valve's control chamber 124 and hence with the inner opposing power chamber 96 and 92. Further inward movement of the poppet member 108 causes the atmospheric valve seat 122 to lift the diaphragm 120 out of engagement with the vacuum valve seat 118 and thereby introduce vacuum to the inner opposing power chambers 96 and 92. As previously indicated atmospheric pressure is continually communicated to the outer opposing power chambers 94 and 98, and the introduction of vacuum to the inner opposing power chambers 92 and 96 causes the pistons $B_1$ and $B_2$ to move forwardly to thereby drive the piston 10 into the fluid pressurizing chamber 12 to displace fluid therefrom. Initial movement of the piston 10 causes its seal 20 to close off the compensating port 24; whereupon further inward movement of the piston 10 displaces fluid past the residual pressure check valve 26 in a manner which will be understood by those skilled in the art.

A predetermined clearance is provided betwen the inner end of the poppet member 108 and the rubber disk 142 to permit the above described valve actuating movement to occur without the poppet member 108 abutting the rubber disk 142. Continued inward movement of the poppet member 108 holds the diaphragm 120 out of engagement with the vacuum valve seat 118 causing increasing differential pressure to be established across the pistons $B_1$ and $B_2$; so that they follow the inward movement of the poppet member 108. When the inward movement of the poppet member 108 is stopped, the pistons $B_1$ and $B_2$ move inwardly slightly thereafter to bring the vacuum valve seat 118 into sealing engagement with the diaphragm 120; whereupon further inward movement of the pistons $B_1$ and $B_2$ ceases. During inward movement of the pistons $B_1$ and $B_2$, increasing amounts of force are transmitted to the plunger 136 causing the rubber disk 142 to be deformed against the poppet member 108, thereby producing a reaction against the foot pedal lever F which will be generally proportional to the amount of force being developed by the servomotor. Retraction of the foot pedal lever F permits the forces produced by the valve return spring 130 and the rubber disk 142 to bias the poppet member 108 rearwardly until its atmospheric valve seat 122 moves out of engagement with the diaphragm 120 to thereby communicate atmospheric pressure with the opposing power chambers 96 and 92. The resulting decrease in differential pressure across the power pistons $B_1$ and $B_2$ permits the forces produced by the hydraulic fluid within the chamber 12, and that produced by the return spring 168, to move the pistons $B_1$ and $B_2$ rearwardly. The pistons $B_1$ and $B_2$ move rearwardly following the movement of the atmospheric valve seat 122 and when its movement ceases, further slight rearward movement of the pistons $B_1$ and $B_2$ brings the diaphragm 120 into engagement with the atmospheric valve seat 122 to lap the valve and prevent further deenergization of the servomotor. A complete retraction of the foot pedal lever F permits the servomotor to be completely deenergized and the pistons $B_1$ and $B_2$ to be biased rearwardly by the spring 168 until the rubber valve rod seal 154 moves into abutment with the flange 152 of the cup-shaped stamping 148.

It will be apparent that the objects heretofore enumerated as well as others have been accomplished; and that there has been provided a new and improved servomotor construction and method of assembling the same which can be manufactured on a mass production basis at considerably less cost than prior art structure.

While the invention has been described in considerable detail, I do not wish to be limited to the particular constructions and methods shown and described. It is my intention to cover hereby all novel adaptations, modifications and arrangements thereof which come within the practice of those skilled in the art to which the invention relates and which come within the scope of the following claims.

I claim:

1. In a fluid pressure motor: a housing having a generally axially extending internal power chamber therein, an annular generally radially inwardly extending partition member in said power chamber having a generally axially positioned opening therethrough, a first molded movable wall on one side of said partition member having an integrally molded annular boss extending through said opening in said partition member, means providing a sliding fluid tight seal between the outer surface of said annular boss and said partition member and axially guiding said boss to prevent radial movement of said boss relative to said housing, a second molded movable wall on the other side of said partition member, said second movable wall having an integrally molded boss which is fitted into the central opening of said annular boss to provide a generally annular passage therebetween, and means locking said bosses together.

2. In a fluid pressure motor: a housing having a generally axially extending internal power chamber therein, an annular generally radially inwardly extending partition member in said power chamber having a generally axially positioned opening therethrough, a first molded movable wall on one side of said partition member having an integrally molded annular boss extending through said opening in said partition member, means providing a sliding fluid tight seal between the outer surface of said annular boss and said partition member and slidably engaging the radially outer surface of said annular boss to radially support said boss relative to said housing, a second molded movable wall on the other side of said partition member, said second movable wall having an integrally molded boss which projects through the central opening of said annular boss to provide a generally annular passage therebetween, and abutment means carried by the projecting end of said boss on said second movable wall for abutting the adjacent end of said first movable wall to prevent separation of said bosses.

3. In a fluid pressure motor: a housing having a generally axially extending internal power chamber therein, an annular generally radially inwardly extending partition member in said power chamber having a generally axially partition member in said power chamber having a generally axially positioned opening therethrough, a first molded movable wall on one side of said partition member having an integrally molded annular boss extending through said opening in said partition member, means providing a sliding fluid tight seal between the outer surface of said annular boss and said partition member and slidingly engaging the radially outer surface of said annular boss to radially support said boss relative to said housing, a second molded movable wall on the other side of said partition member, said second movable wall having an integrally molded boss which is fitted into the central opening of said annular boss, the surface of the opening through the annular boss and the external surface of said second boss having spaced apart portions running lengthwise of the bosses to conduct fluid flow between the chambers lying on corresponding sides of said movable walls, and means preventing separation of said bosses.

4. In a fluid pressure motor: a housing having a generally axially extending internal power chamber therein, an annular generally radially inwardly extending partition member in said power chamber having a generally axially positioned opening therethrough, a first molded movable wall on one side of said partition member having an integrally molded annular boss extending through said opening in said partition member, means providing a sliding fluid tight seal between the outer surface of said annular boss and said partition member and slidingly engaging the radially outer surface of said annular boss to radially support said boss relative to said housing, a second molded movable wall on the other side of said partition member, said second movable wall having an integrally molded second boss which is fitted into the central opening of said annular boss, the surface of the opening through the annular boss and the external surface of said second boss having spaced apart portions running lengthwise of the bosses as provided by fillets on at least one of the surfaces to conduct fluid between the chambers lying on corresponding sides of said movable walls, and means preventing separation of said bosses.

5. In a fluid pressure motor: a housing having a generally axially extending internal power chamber therein, an annular generally radially inwardly extending partition member in said power chamber having a generally axially positioned opening therethrough, a first molded movable wall on one side of said partition member having an integrally molded annular boss extending through said opening in said partition member, means providing a sliding fluid tight seal between the outer surface of said annular boss and said partition member and slidingly engaging the radially outer surface of said annular boss to radially support said boss relative to said housing, a second molded movable wall on the other side of said partition member, said second movable wall having an integrally molded boss which is fitted into the central opening of said annular boss, the surface of the opening through the annular boss and the external surface of said second boss having spaced apart portions running lengthwise of the bosses to conduct fluid flow between the chambers lying on corresponding sides of said movable walls, and means preventing separation of said bosses, said first and second movable walls being connected to the sidewalls of said internal power chamber solely by flexible diaphragm means, and a member driven by said movable walls, said second boss being recessed to provide an abutment surface for said driven member, which abutment surface is located in the region lying generally beneath said partition chamber.

6. In a fluid pressure servomotor: a housing having a generally axially extending internal power chamber therein, an annular generally radially inwardly extending partition member in said power chamber having a generally axially positioned opening therethrough, a first movable wall on one side of said partition member having a first annual boss extending through said opening in said partition member, means providing a sliding fluid tight seal between the outer surface of said annular boss and said partition member said sliding seal radially supporting said annular boss relative to said housing, a second movable wall on the other side of said partition member, said second movable wall having a second boss which is fitted into the central opening of said annular boss, the surface of the opening through the annular boss and the external surface of said second boss having spaced apart portions running lengthwise of the bosses to conduct fluid flow between the chambers lying on corresponding sides of said movable walls, means preventing separation of said bosses, said first and second movable walls being connected to the sidewalls of said internal power chamber solely by flexible diaphragm means, said boss of said second movable wall having a valve chamber therein opening into one side of said second movable wall, a valve control member extending into said valve chamber from one end of said motor, a member driven by said movable walls and extending out of the other side of said motor, said control and driven members being slidingly received in said boss of said second movable wall by guiding surfaces and being adapted to be engaged by abutment surfaces for transferring force from said control member to said driven member, which guiding and abutment surfaces are located in said second boss in the region lying generally beneath said partition member.

References Cited in the file of this patent

UNITED STATES PATENTS

| | | |
|---|---|---|
| 1,879,365 | Lombard | Sept. 27, 1932 |
| 2,404,932 | Stelzer | July 30, 1946 |
| 2,413,380 | Rush et al. | Dec. 31, 1946 |
| 2,517,005 | Mac Duff | Aug. 1, 1950 |
| 2,587,403 | Stelzer | Feb. 26, 1952 |
| 2,587,404 | Stelzer | Feb. 26, 1952 |
| 2,587,803 | Adams | Mar. 4, 1952 |
| 2,617,261 | Ringer | Nov. 11, 1952 |

UNITED STATES PATENT OFFICE
CERTIFICATE OF CORRECTION

Patent No. 3,013,536                       December 19, 1961

Maxwell L. Cripe

It is hereby certified that error appears in the above numbered patent requiring correction and that the said Letters Patent should read as corrected below.

Column 4, line 44, before "been" insert -- previously --; column 8, line 49, for "chamber" read -- member --.

Signed and sealed this 1st day of May 1962.

(SEAL)
Attest:

ERNEST W. SWIDER
Attesting Officer

DAVID L. LADD
Commissioner of Patents